United States Patent [19]

Oglesby et al.

[11] Patent Number: 4,757,675
[45] Date of Patent: Jul. 19, 1988

[54] PROCESS AND APPARATUS FOR MAKING FIBER OPTIC CABLE

[75] Inventors: Michael G. Oglesby, Kansas City, Mo.; Alfred S. Violette, Olathe, Kans.; Michael E. McGuire, Lenexa, Kans.; Kenneth E. Cornelison, Overland Park, Kans.

[73] Assignee: Ericsson TelecomCable, Overland Park, Kans.

[21] Appl. No.: 16,128

[22] Filed: Feb. 18, 1987

[51] Int. Cl.[4] .................. H01B 13/02; H01B 11/22; G02B 6/04
[52] U.S. Cl. .............................. 57/6; 57/9; 57/13; 57/352
[58] Field of Search .............. 57/6, 7, 9, 11, 13–15, 57/352; 350/96.27

[56] References Cited

U.S. PATENT DOCUMENTS

| | | | |
|---|---|---|---|
| 4,154,049 | 5/1979 | King et al. | 57/9 |
| 4,205,899 | 6/1980 | King et al. | 57/9 X |
| 4,620,412 | 11/1986 | Portinari | 57/6 |
| 4,635,430 | 1/1987 | Missout et al. | 57/6 |
| 4,663,926 | 5/1987 | Girardon et al. | 57/13 X |
| 4,676,054 | 6/1987 | Veld | 57/6 |

*Primary Examiner*—John Petrakes
*Attorney, Agent, or Firm*—Burns, Doane, Swecker & Mathis

[57] ABSTRACT

An apparatus and a process for simultaneously twisting a channeled core rod, inserting optical fibers into the channels and capturing the twist of the rod while minimizing the insertion stresses imposed on the optical fibers. The apparatus comprises a shape capture die, an insertion die and a core capture means which are located proximate one another to provide a short region of twisting. The insertion die is rotationally fixed to the shape capture die so that as the core passes through the center of the insertion die the fibers are automatically inserted into the channels of the core. The core and inserted fibers are then passed to a core capture means which controls rotation of the core but permits its axial translation. The rotating elements of the machine are driven from a line shaft or other suitable means providing them with identical rotation rates. In this way the core is twisted to form helical channels with inserted fibers without requiring elaborate synchronization of the core translation drive and the fiber insertion die.

28 Claims, 9 Drawing Sheets

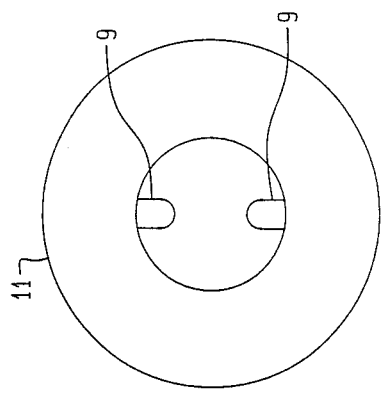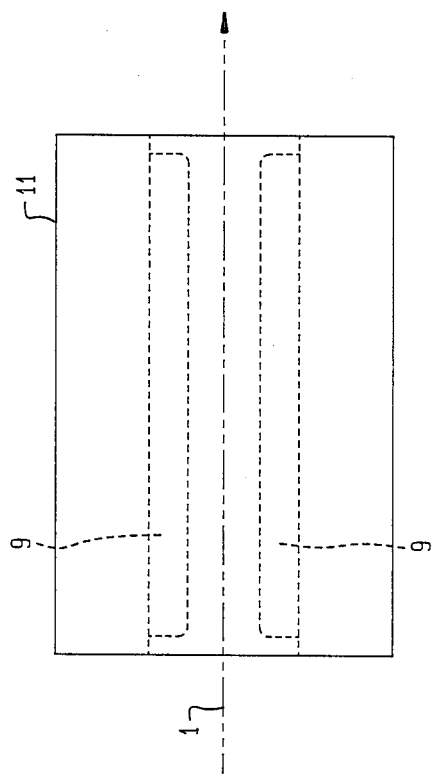

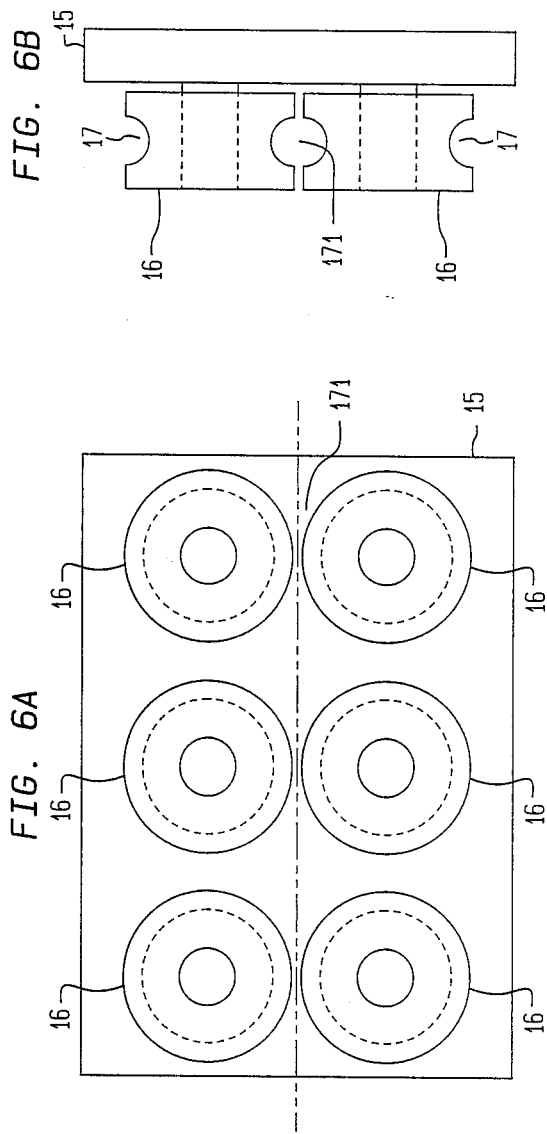

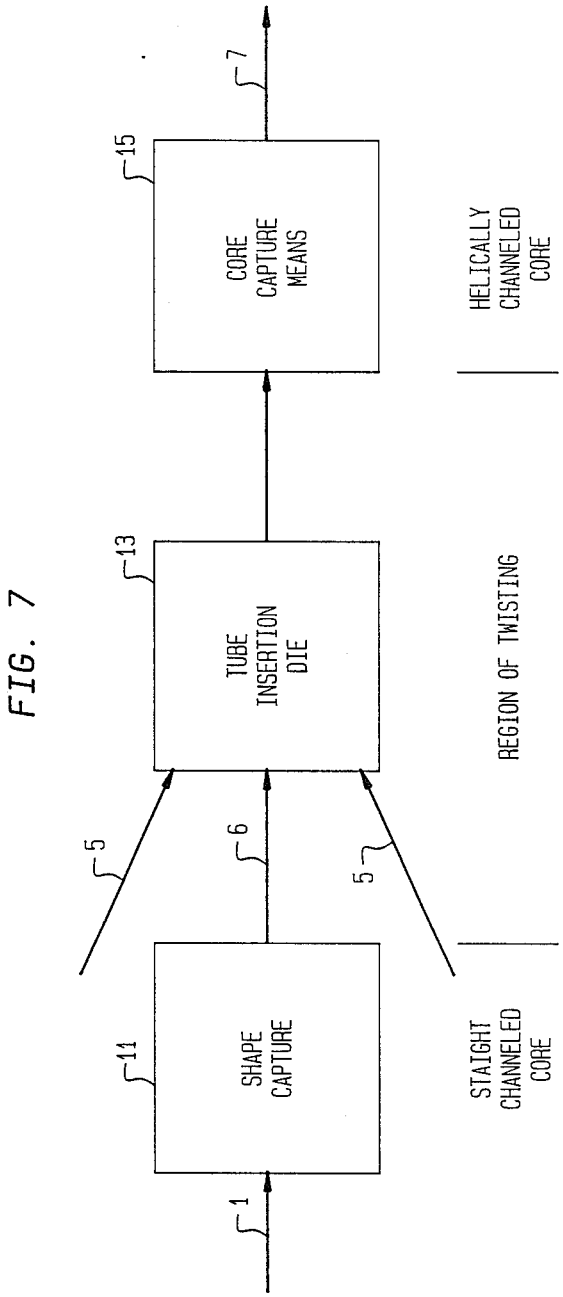

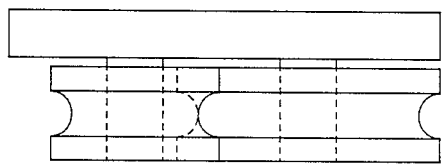
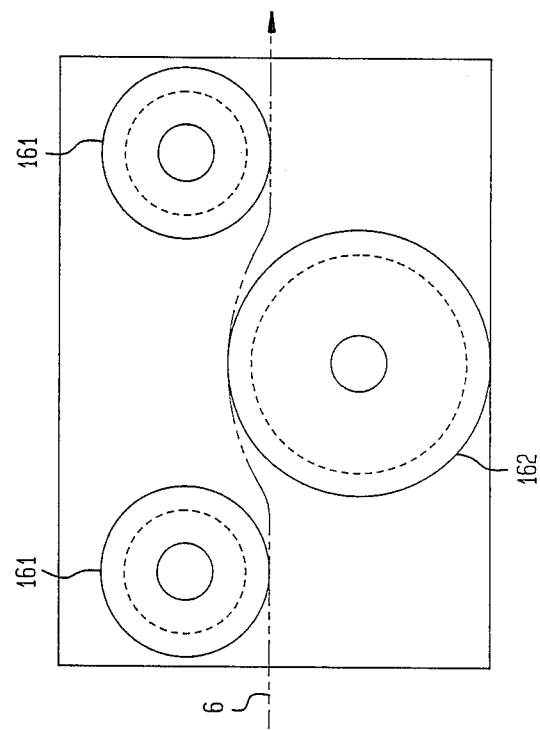

PROCESS AND APPARATUS FOR MAKING FIBER OPTIC CABLE

This application is related to co-pending application Ser. No. 016,103, filed Feb. 18, 1987, by Michael L. Oglesby et al and entitled "A FIBER OPTIC CABLE HAVING AN EXTENDED ELONGATION WINDOW".

BACKGROUND

The present invention relates to an apparatus and a process for manufacturing telecommunication cable in which a cylindrical core having one or more channels in its periphery is twisted and optical fibers are inserted into the resulting helical channels.

The large information transmission capacity of optical fibers has prompted their use in a wide variety of telecommunication applications having different physical and environmental conditions. Of particular importance are long-distance applications which can involve submarine, underground or overhead cable installations. Although individual optical fibers can be quite strong, having breaking strengths as great as 400–800 KPSI, the fibers require protection by cable structures that isolate them from tensile stresses which occur during installation and use. Also important is the protection the cable affords the fibers from the elements, particularly water.

A suitable cable structure which provides such protection for the optical fibers is described in detail and claimed in the co-pending related application mentioned above. Generally, as shown in partial cross-section in FIG. 1a, that cable comprises a central cylindrical core 1 having one or more helical channels 2 in its periphery (two are shown in the figure). The optical fibers 3 are randomly positioned within buffer tubes 5 that are located in the channels, with the core and fibers being overwrapped by a tape layer 4. Not shown in FIG. 1a is a serving of wires which are wrapped around the taped core to provide the tensile strength and other capabilities which may be required by the particular cable application. The controlled helical pitch of the channels, the inside diameter of the tubes, the ratio of the linear fiber length to the linear tube length, and the diameter of the fiber or tube helix combine to create a cable with a large elongation window, i.e., a cable for which a large cable strain produces little or no added fiber strain. Insufficient fiber- to tube-length ratios can allow stress to be transmitted to the fibers with possible breakage during installation and/or use, while excessive fiber- to tube-length ratios can cause greater optical transmission losses due to fiber bends in the tubes.

The very insertion of the fibers into the channels subjects them to undesirable stress which can affect their transmission performance. Some insertion stresses are nearly unavoidable, such as those generated from bends and twists which are imposed on the fibers as they pass from supply spools through a cabling machine into the channels. Additional sources of fiber stress are caused by differences between the feed rate of the core or helical pitch of the channels and the supply rate of the fibers.

Various devices for laying optical fibers in the channels of a central cylindrical support have been disclosed, for example U.S. Pat. Nos. 4,154,049, 4,205,899, 4,309,864, 4,388,799, 4,395,869, 4,411,130 and 4,497,164. Separate cabling machines sequentially perform the tasks of twisting the core to form helical channels and inserting the fibers into the channels; as a result they can subject the fibers to the additional insertion stresses noted above. To minimize these excess stresses, the cabling devices disclosed in these patents have therefore incorporated various approaches including servomechanisms and other feedback devices to synchronize the means for laying the fibers into the channels with the helical pitch. Other approaches involve the use of fiber insertion heads having flexible tubes which extend into and contact the channels and thus guide the fibers into the channels. Besides the relatively increased complexity and higher cost of the cabling machines disclosed in the patents mentioned above, insertion stresses are not completely eliminated.

SUMMARY

Accordingly, the present invention is directed to an apparatus and a process for simultaneously twisting a channeled core rod, inserting fibers into the channels and capturing the twist of the rod while minimizing the insertion stresses imposed on the optical fibers. The problems associated with synchronizing the helical pitch of the channels and the fiber feed rate are avoided because the tasks are combined in one machine which can be driven by a line shaft.

The apparatus comprises a shape capture die, an insertion die and a core capture means which are located proximate one another to provide a short region of twisting. A longitudinally channeled core rod is rotated about and translated along its axis. The rotating core passes through the center of the shape capture die which may have tabs or other suitable means arranged to protrude into and engage the longitudinal channels of the core. The shape capture die rotates at the same rate as the core, as does a conventional planetary arrangement from which optical fibers are passed through guide holes in an insertion die which aims the fibers into the channels of the core. The insertion die is rotationally fixed to the shape capture die so that as the core passes through the center of the insertion die the fibers are automatically inserted into the channels of the core. The still-rotating core and inserted fibers are then passed to a core capture means which stops the rotation of the core but permits its axial translation. The rotating elements of the machine are driven from a line shaft or other suitable means providing them with identical rotation rates. In this way the core is twisted to form helical channels with inserted fibers without requiring elaborate synchronization of the core translation drive and the fiber insertion die.

In an alternate embodiment the shape capture die may comprise a set of wheels having rims which protrude into and engage the longitudinal channels of the core. The wheels thus roll along surfaces of the channels thereby substantially eliminating friction and scraping of the shape capture die against the channels.

In a further embodiment, the core may include one or more auxiliary channels for engagement by the shape capture die and into which the fibers may also be inserted. The auxiliary channels may have a suitable shape which is different from the fiber channels.

In another embodiment the core may be axially translated through an apparatus according to the present invention in which the rotation (relative to the earth) of the shape capture die, the insertion die and the core capture means is reversed or otherwise altered.

BRIEF DESCRIPTION OF THE DRAWINGS

Other objects, advantages and embodiments will become apparent to one of ordinary skill in the art to which the present invention pertains by reading the following detailed description in conjunction with the drawings in which:

FIGS. 3a and 3b are orthogonal views of an embodiment of the shape capture die according to the present invention;

FIGS. 6a and 6b are orthogonal views of an embodiment of the core capture means according to the present invention;

FIG. 7 is a block diagram showing one arrangement of an apparatus according to the present invention;

FIGS. 9a and 9b are orthogonal views of an alternative embodiment of the core capture means.

DETAILED DESCRIPTION

Figure 2:
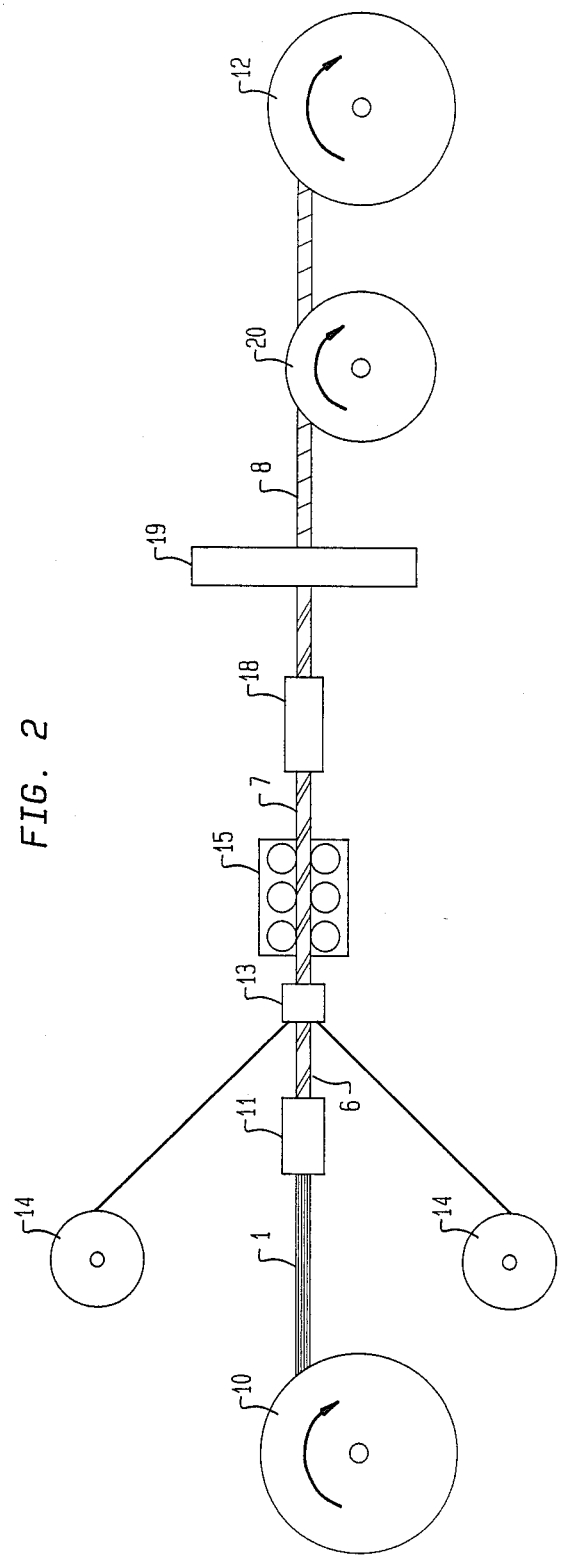
FIG. 2 is a diagram of a cabling machine.

FIG. 2 is a diagram of a cabling machine such as might be used with an apparatus according to the present invention. A payoff reel 10 supplies a continuous length of core rod 1 having one or more straight longitudinal channels in its periphery. The rod 1 translates through the machine under the impetus of a capstan 20 and is drawn from the reel 10 against suitable tension to avoid tangling problems and the like. The payoff reel 10, besides rotating in the direction of the arrow, rotates about the axis of the rod 1. Thus the rod 1 is caused to rotate about, while simultaneously translating along, its axis. The rate of rotation of the reel 10 about the axis of the core rod 1 is suitably adjusted relative to the rate of translation of the rod to produce a core having helical channels of the desired pitch.

After leaving the payoff reel 10, the rotating core 1 may pass through a conventional oiler device (not shown) for applying an appropriate lubricating fluid to the core. This lubrication may be desirable to avoid possible damage to the core or the channels by a shape capture die 11 and to aid in the smooth insertion of the optical fibers into the channels in the core's periphery.

Figure 1A:
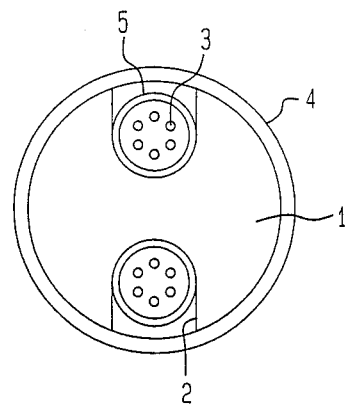
FIGS. 1a and 1b are cross-sections of portions of fiber optic cables.
Figure 1B:
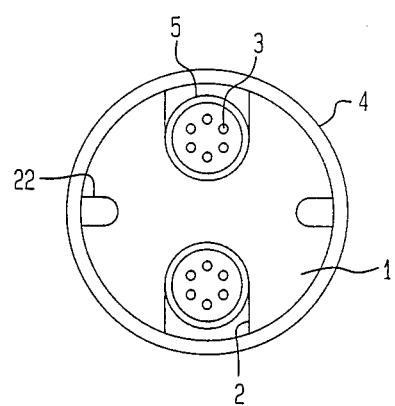

A shape capture die 11 and an insertion die 13 also rotate about the axis of the translating channeled rod 1 at the same rate as the payoff reel 10. In one embodiment, as shown by two orthogonal views in FIGS. 3a and 3b, the shape capture die is a cylinder having an axial opening for passage of the core 1. Within the opening are tabs 9 which are arranged to protrude into and engage the channels in the periphery of the core. The shape capture die as a whole or the tabs alone may be of any material suitable to resist the torsion of the twisting core without damaging the channels or the rod. Alternatively, the shape capture die 11 may engage one or more auxiliary channels in the rod 1. As shown in FIG. 1b, the auxiliary channels 22, which can have a shape different from the main fiber channels, are subject to the friction and scraping of the tabs of the capture die 11, leaving the main channels undisturbed. The shape capture die prevents downstream torsion produced in the core from propagating in a random fashion back toward the payoff reel 10 by controlling the axial rotation of the core.

Figure 4B:
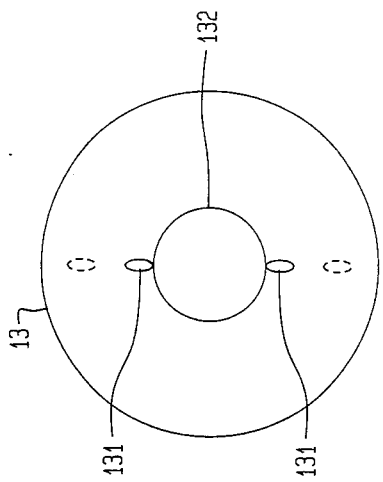
FIGS. 4a and 4b are orthogonal views of an embodiment of the insertion die in accordance with the present invention.
Figure 4A:
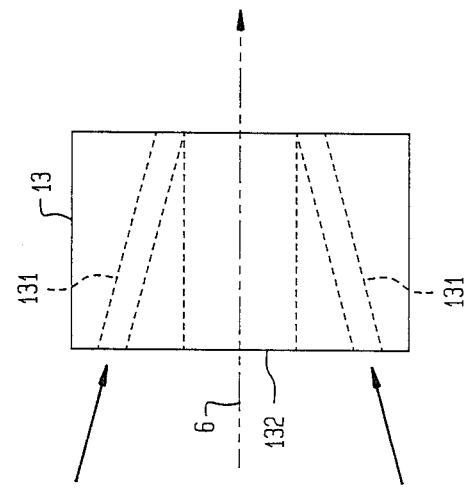
Figure 5:
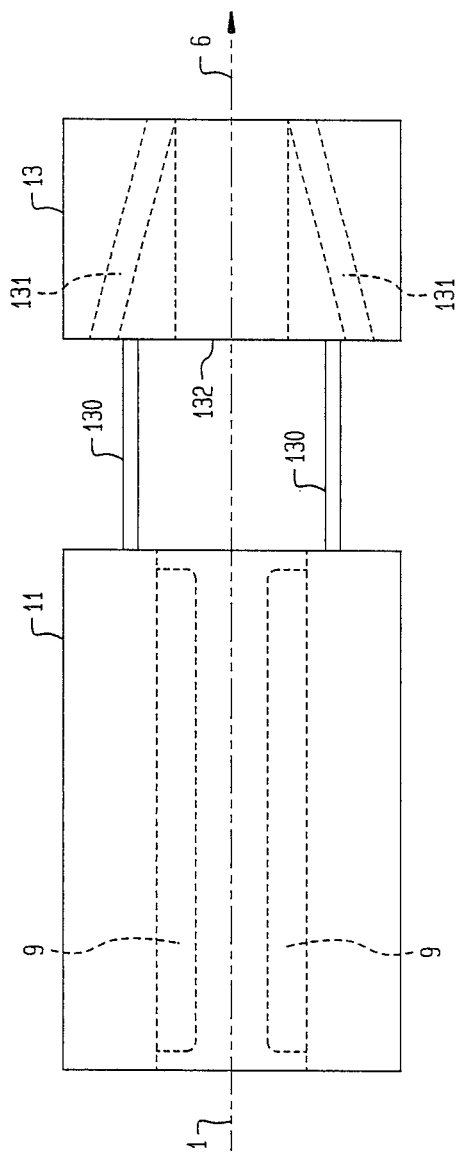
FIG. 5 is a side view of an embodiment of the shape capture die and the insertion die according to the present invention.

A suitable embodiment of the insertion die 13 is shown in FIGS. 4a and 4b. The insertion die is also cylindrical with an axial opening 132 for passage of the translating core; the die 13 rotates about its axis at the same rate as the twisting die 11. Holes 131 are formed in the die 13 at a suitable angle to the axis of rotation to guide with minimal stress the fibers or the tubes containing them into the channels in the twisting core 6. The insertion die 13 is rotationally aligned with the tabs 9 of the shape capture die 11 so that the fibers exit the angled holes in a manner which causes them to be aimed directly into the channels. Once aligned, the insertion die 13 is rotationally fixed with respect to the shape capture die 11, as shown in FIG. 5, eliminating any requirement for elaborate die synchronization mechanisms. FIG. 5 shows a side view of the shape capture die 11 and the insertion die 13 rigidly affixed to each other by means of, for example, bars 130. Also, since the insertion die 13 does not have any tubes or guides which extend into and contact the channels, friction and wear on the die 13 and the twisting core 6 are reduced.

Referring again to FIG. 2 the optical fibers or the tubes 5 containing them are supplied to the insertion die 13 from payoff spools 14 arranged in a conventional planetary strander. The spools 14 are supported by a plate (not shown) which rotates about the axis of the core 1 at the same rate as that of the core and the shape capture die 11. The spools 14 maintain a constant spatial orientation, i.e. they rotate with respect to the surface of the plate, so that as the plate rotates, torsion is not imposed on the fibers or tubes as they are laid into the channels.

After passage through the shape capture and insertion dies, the twisting core passes to a non-rotating core capture device 15 which arrests its rotation but allows the core to continue translating. One embodiment of the core capture means, shown in the two orthogonal views of FIGS. 6a and 6b, comprises a set of pinch wheels 16. Each wheel has a grooved rim 17 and is mounted with another similarly grooved wheel so that the grooves are opposed, forming a passageway 171 of substantially circular cross-section for the twisting channeled core. The diameter of the passageway formed by the pinch wheels is adjustable to be sufficiently less than the diameter of the core so that the wheels exert a uniform radial force on the core. Through this adjustment, the friction between the core periphery and the grooves of the pinch wheels can be made sufficient to control the continued rotation of the core but not so large as to overly impede the translation of the core. The uniformity of the radial compression exerted by the core capture device 15 avoids possible damage to the core and fibers.

As illustrated by the block diagram of FIG. 7, the apparatus of the present invention performs the tasks of core twisting, fiber inserting and rotation control simultaneously. By affixing the dies 11 and 13 to one another as well as by positioning them and the capture means 15 in proximity to one another in one cabling machine, the region of twisting is kept short and the dies and other rotating elements of the machine can be driven by a common source such as a line shaft. The helical pitch of the core is thus automatically synchronized with the fiber feed mechanism so that insertion stresses imposed on the optical fibers are minimized.

Referring again to FIG. 2, after passing through the core capture means 15 the now helically-channeled, non-rotating core and fibers 7 pass to a filling head 18 for applying a coating of a filling compound. The compound may be a dielectric waterblocking type which may have flame-retardant properties, depending on the application for which the cable is intended. The compound fills the interstices between the fibers or tubes and the channels and may be flexible enough to allow the fibers or tubes to move within the channels. As described in the copending related application mentioned above, the cable is formed to have large elongation window which isolates the fibers from tensile loads on the cable.

After the filling head 18, the core passes to a taping head 19 which can be of any conventional type for applying a sheath to the core and fibers. The sheath may be a helically-wrapped metal layer, a metallized plastic or a dielectric, again depending on the ultimate application intended for the cable. After application of the tape layer, the wrapped core and fibers 8 are drawn by the capstan 20, which provides the power for translating the core through the machine, and stored on take-up reel 12. The wrapped core may then be supplied to another machine from the reel 12 for applying a stranded outer serving of wires or other further processing.

Figure 8B:
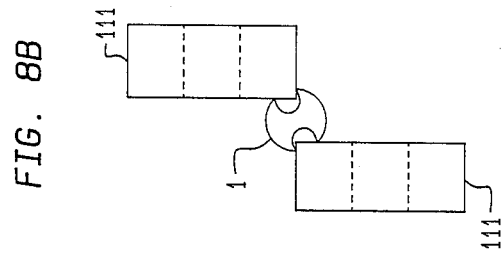
FIGS. 8a and 8b are orthogonal views of an alternate embodiment which may be used as either the shape capture die or the core capture means.
Figure 8A:
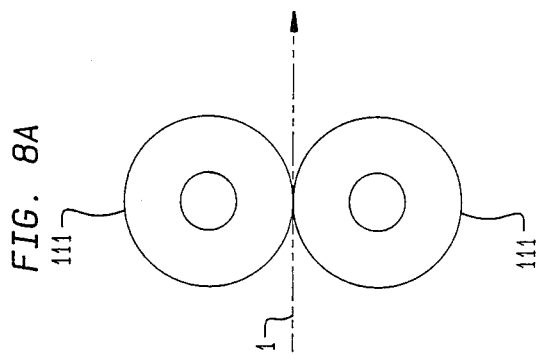

It will be understood by one of ordinary skill in the art to which the present invention pertains that there are many alternate embodiments of the apparatus described above which are yet within the scope and spirit of the present invention. FIGS. 8a and 8b show two views of an alternate embodiment of the shape capture die comprising a pair of axially offset wheels 111. Each wheel is positioned so that a portion of its rim protrudes into a channel of the core rod 1; the wheels are supported by axles (not shown) which pass through the wheels as indicated by the dashed lines. The wheels are thus free to roll along surfaces of the channels, minimizing friction and scraping of the shape capture die against the core. The axles are supported by a plate (not shown) which includes an opening for passage of the core rod 1. The plate is caused to rotate about the axis of the core in the same way as the shape capture die 11 shown in FIG. 3. The offset wheels 111 may also be used as an alternate embodiment of the rotation capture means 15; in that case the plate supporting the axles of the wheels does not rotate about the axis of the twisting core.

FIGS. 9a and 9b show an alternate embodiment of the core capture means. Three radially offset wheels 161, 162 having grooved rims are arranged with the grooved rim of the middle wheel 162 being radially offset from a tangential line formed between the rims of the other two wheels 161 so that the twisting core 6 is deflected as it translates through the capture means. The deflection forces the core against the grooves, generating friction which controls the rotation of the core; the wheels are supported by axles (shown in the end view by the dashed lines) which allow the wheels to rotate and thus the core to continue translating.

An alternate embodiment of a cabling machine in accordance with the present invention reverses the relative rotations of the shape capture die, the insertion die and the core capture means. In this embodiment, the payoff reel 10 continues to rotate in the direction of the arrow shown in FIG. 2, but no longer rotates about the axis of the core rod 1. The non-rotating core 1, again drawn through the machine by the capstan 20, passes through a non-rotating shape capture die 11 and a non-rotating insertion die 13. These dies can be embodied as already described. In this embodiment, the core capture means 15, the capstan 20 and the take-up reel 12 are rotated about the axis of the cable. These rotating elements can also be driven by a common source such as a line shaft. The optical fibers or the tubes 5 containing them are supplied from conventional anti-back-twist bobbins which are supported by a non-rotating plate. The bobbins rotate in the direction opposite to that of the core capture means 15, the capstan 20 and the take-up reel 12, causing the fibers or the tubes containing them to rotate about their axes, thereby avoiding torsion on the fibers or tubes as they are laid into the channels of the twisting core. In this embodiment, the region of twisting is still kept short and the rotating elements are still driven by the same source so the insertion stresses on the fibers are also minimized. The remaining elements of the machine are conventional and have functions corresponding to those already shown and described.

The present invention has been described in connection with certain embodiments which are intended in all ways to be considered illustrative and not restrictive. The scope of the invention should be determined from the appended claims, rather than the foregoing description, and any embodiments within the range of equivalence of those described above is intended to be included by them.

What is claimed is:

1. In a cabling machine for producing a fiber optic cable, an apparatus for minimizing stresses imposed on optical fibers being inserted into at least one channel in the periphery of a cylindrical core, comprising:
   a shape capture die for controlling axial rotation of the core while allowing longitudinal translation of the core;
   an insertion die for guiding fibers into the channel while allowing longitudinal translation of the core, wherein the insertion die is rotationally fixed with respect to the shape capture die and is located proximate the shape capture die; and
   a core capture means for stopping axial rotation of the core while allowing its longitudinal translation, wherein the core capture means is located proximate the shape capture die and insertion die.

2. The apparatus of claim 1, wherein the shape capture die and the insertion die are rigidly affixed to each other.

3. The apparatus of claim 1, wherein the fibers are contained in at least one tube, and said insertion die comprises means for guiding said tube into the at least one channel.

4. The apparatus of claim 1, wherein the shape capture die includes a longitudinal tab for engaging the at least one channel in the periphery of the cylindrical core.

5. The apparatus of claim 4, wherein the shape capture die engages at least one auxiliary channel in the periphery of the core.

6. The apparatus of claim 1, wherein at least one of the shape capture die and the core capture means includes at least one wheel for contacting the core.

7. The apparatus of claim 6, wherein at least one of the shape capture die and the core capture means includes a plurality of wheels having rims which protrude into the at least one channel in the periphery of the core.

8. The apparatus of claim 6, wherein the core capture means includes a plurality of pinch wheels having grooved rims, the wheels being arranged so that the grooves are opposed to form a passageway of substantially circular cross-section for the core.

9. The apparatus of claim 6, wherein the core capture means includes a plurality of wheels having grooved rims, the wheels being radially offset for deflecting the core while the core translates longitudinally.

10. The apparatus of claim 6, wherein the shape capture die engages at least one auxiliary channel in the periphery of the core.

11. In a cabling machine for producing a fiber optic cable, an apparatus for minimizing stresses imposed on at least one optical fiber randomly located within at least one tube being inserted into at least one channel in the periphery of a cylindrical core, comprising:
a shape capture die for controlling axial rotation of the core while allowing longitudinal translation of the core;
an insertion die for guiding the tube and said at least one optical fiber into the channel while allowing longitudinal translation of the core wherein the insertion die is rotationally fixed with respect to the shape capture die and is located proximate the shape capture die; and
a core capture means for controlling axial rotation of the core while allowing its longitudinal translation, wherein the core capture means is located proximate the shape capture die and insertion die.

12. The apparatus of claim 11, wherein the shape capture die and the insertion die are rigidly affixed to each other.

13. The apparatus of claim 11, wherein the shape capture die includes a longitudinal tab for engaging the at least one channel.

14. The apparatus of claim 13, wherein the shape capture die engages at least one auxiliary channel in the periphery of the core.

15. The apparatus of claim 11, wherein at least one of the shape capture die and the core capture means includes at least one wheel for contacting the core.

16. The apparatus of claim 15, wherein the shape capture die engages at least one auxiliary channel in the periphery of the core.

17. The apparatus of claim 15, wherein at least one of the shape capture die and the core capture means includes a plurality of wheels having rims which protrude into the at least one channel in the periphery of the core.

18. The apparatus of claim 15, wherein the core capture means includes a plurality of pinch wheels having grooved rims, the wheels being arranged so that the grooves are opposed to form a passageway of substantially circular cross-section for the core.

19. The apparatus of claim 15, wherein the core capture means includes a plurality of wheels having grooved rims, the wheels being radially offset for deflecting the core while the core translates longitudinally.

20. In a cabling machine for producing a fiber-optic cable having a cylindrical core with at least one channel in its periphery, a process for twisting the core and for minimizing stresses imposed on at least one optical fiber being inserted into the channel, comprising the steps of:
rotating the core about its axis;
longitudinally translating the core along its axis through a shape capture means for controlling the axial rotation of the core;
twisting the core with the shape capture means to form a helical channel;
inserting at least one optical fiber into the channel through an insertion die which is rotationally fixed with respect to the shape capture means and is located proximate the shape capture means; and
controlling the axial rotation of the core while allowing its longitudinal translation by a core capture means located proximate the shape capture means and insertion die.

21. The process of claim 20, further including the step of rigidly affixing the shape capture means and the insertion die to each other.

22. The process of claim 20, further including the step of engaging the at least one channel with a longitudinal tab of the shape capture means.

23. The process of claim 22, wherein the longitudinal tab of the shape capture means engages at least one auxiliary channel in the periphery of the core.

24. The process of claim 20, further including the step of contacting the core with a wheel included in at least one of the shape capture means and the core capture means.

25. The process of claim 24, wherein the wheel included in the shape capture means engages at least one auxiliary channel in the periphery of the core.

26. The process of claim 20, wherein the fibers are contained in at least one tube.

27. The process of claim 20, wherein the shape capture means and the insertion die rotate about the axis of the core, and the core capture means is rotationally fixed with respect to the axis of the core.

28. The process of claim 20, wherein the core capture means rotates about the axis of the core, while the shape capture means and the insertion die are rotationally fixed with respect to the axis of the core.

* * * * *